Jan. 9, 1923.

M. MATHIEU.
RECTIFYING DEVICE FOR WEIGHING MACHINES.
FILED MAR. 9, 1921.

1,441,236

Patented Jan. 9, 1923.

1,441,236

UNITED STATES PATENT OFFICE.

MARIUS MATHIEU, OF PARIS, FRANCE.

RECTIFYING DEVICE FOR WEIGHING MACHINES.

Application filed March 9, 1921. Serial No. 450,924.

*To all whom it may concern:*

Be it known that I, MARIUS MATHIEU, a citizen of the French Republic, residing at Paris, France, have invented certain new and useful Improvements in and Relating to the Rectifying Devices for Weighing Machines, of which the following is a specification.

For the construction of automatic weighing machines the load-balancing pendulum lever is used most because it is by far the simplest. To make the angles which correspond with the oscillations of the load-balancing pendulum lever proportional to the loads, which is an indispensible condition in practice, it is however necessary to use a rectifying segment according to the theoretic considerations. It is however very difficult to make such segments absolutely accurate, as the radii of curvature of said segment are degressive and the precise mounting of the same which must satisfy very strict conditions of wedging and of centering constitutes such dainty work are such that it becomes practically impossible.

This invention has for its object the suppression of these inconveniences by substituting for the useful part of said segment the circumference of a circular eccentric disc of adjustable position.

In the accompanying drawing a device constructed according to this invention is shown by way of example.

Figure 1:
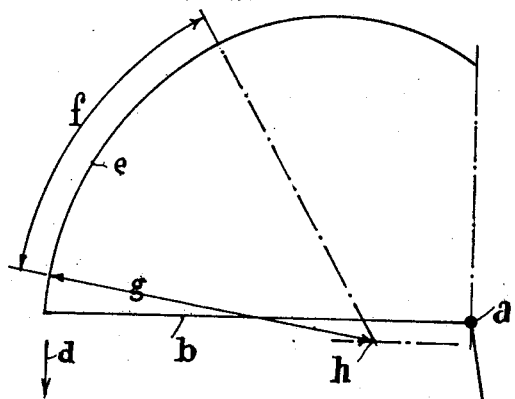
Fig. 1 shows a theoretic diagram of a load-balancing pendulum lever with rectifying cam.
Figure 2:
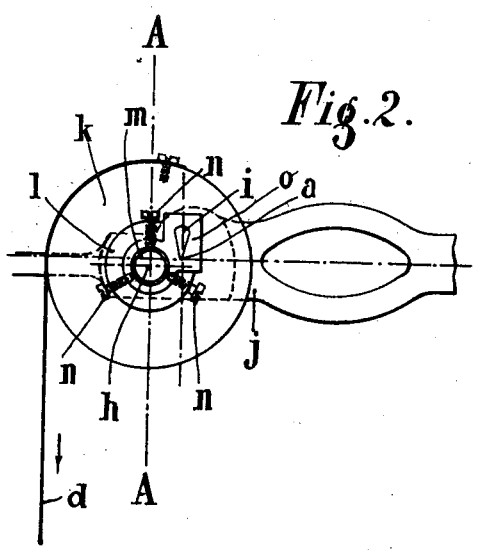
Fig. 2 is a front view of the improved device.
Figure 3:
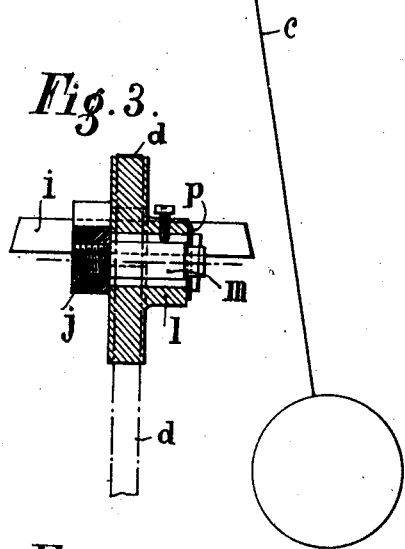
Fig. 3 is a section on line A—A of Fig. 2.
Figure 4:
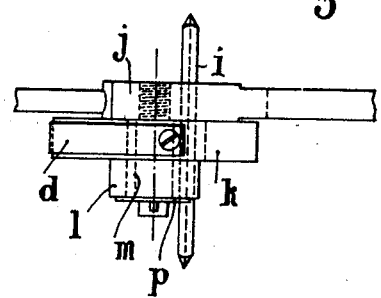
Fig. 4 is a plan view.
Figure 5:
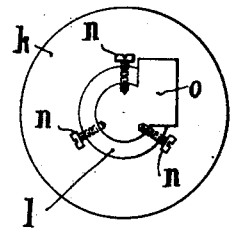
Fig. 5 shows in front view the disc with adjustable centering.

With reference to Fig. 1, $a$ is the center of oscillation of the load-balancing pendulum lever of which $b$ represents the acting arm of the load and $c$ the arm of the counterweight. In conformity with the theoretical considerations the load-balancing pendulum lever and the indicating pointer are made to describe equal angles for equal increments of load through making variable the length of the power arm $b$ which has been realized by means of a segment of degressive radii over the surface of which passes a chain $d$ to which the load is suspended.

In the practical application of a device of this type a relatively small portion of the surface of the segment is utilized. It has been found that this portion, of limited amplitude, conformed as exactly as it is possible to estimate with an arc the centre of which occupies a determined position different from that of the center of oscillation.

In the form of construction shown by way of example, $e$ is the theoretic curve which determines the diagram of the periphery of the rectifying segment. For the portion $f$ of an amplitude which is practically sufficient for the effect to be obtained, this curve coincides, if not theoretically, at least exactly as it can be appreciated, with an arc with the radius $g$ having its center at $h$. Starting from this established fact it is certain that a circular disc having $g$ as radius and $h$ as center could be substituted for the segment $e$, its center of oscillation being however at $a$, the theoretic and real center of the segment.

Figures 2 to 5 represent an example of application of this device. Referring to these figures, $a$ is the center of oscillation of the beam, this center of oscillation being constituted by the acute angle of the knife edge $i$ mounted in the piece $j$ to which directly or indirectly the other elements of the load-balancing lever or of the apparatus to which it is applied are connected. $h$ is the center of the disc $k$ one portion of the periphery of which coincides practically with the corresponding portion of the curve determined by the diagram for ensuring the rectification of the load-balancing lever, the radius of this disc and the position of its center being determined in consequence. This disc $k$ carries a collar $l$ the inner diameter of which is longer than the diameter of a spindle $m$ mounted upon the piece $j$ and the axis of which coincides with the theoretic center of the disc. This disc $h$ is applied against the piece $j$ and fixed upon the spindle $m$ by means of three pressure screws $n$ which permit to regulate and rectify accurately and easily the position of said disc. The disc $k$ and if required its collar $l$ have an opening $o$ through which the knife edge $i$ can pass with play. When the position of the disc has been definitely regulated by means of the screws $n$ this position is ensured by means of a washer $p$ pressed against the collar $l$ or in any other convenient manner.

The chain $d$ to which the load is suspended is attached upon the disc $k$ beyond its useful part and thus this useful part of the disc is substituted for the corresponding part of theoretic rectifying curve. The construction is however considerably simplified and a much greater practical precision is realized as the utilized part of the curve is nothing else but a cylindric surface which can be easily turned on the lathe and the precise centering of which can be rapidly obtained through the arrangement described.

It is evident that the form of the opening $o$ of the disc $k$ can vary as well as the position of the same for the reason of the variation of the theoretic center of the said disc according to the part of the rectifying curve which is utilized. For this disc there could further be substituted a segment comprising only the utilized portion.

I claim:—

An improved device for rectifying load-balancing pendulum levers comprising a pendulum, a disk, regulating screws by which said disk is mounted on the pendulum eccentrically with reference to its pivot, means attached peripherally to said disk adapted for connection to a load supporting means.

In testimony whereof I affix my signature in presence of two witnesses.

MARIUS MATHIEU.

Witnesses:
 HENRI BLOUIN,
 ROBERT BLOUIN.